US012756938B2

(12) United States Patent
Kuriki et al.

(10) Patent No.: US 12,756,938 B2
(45) Date of Patent: Oct. 6, 2026

(54) IMAGE CAPTURING APPARATUS CAPABLE OF PERFORMING EXPOSURE CORRECTION, METHOD OF CONTROLLING IMAGE CAPTURING APPARATUS, AND STORAGE MEDIUM

(71) Applicant: CANON KABUSHIKI KAISHA, Tokyo (JP)

(72) Inventors: Yoma Kuriki, Tokyo (JP); Shoji Yonehata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 19/065,462

(22) Filed: Feb. 27, 2025

(65) Prior Publication Data

US 2025/0287109 A1 Sep. 11, 2025

(30) Foreign Application Priority Data

Mar. 11, 2024 (JP) ................................ 2024-036754

(51) Int. Cl.
*H04N 23/73* (2023.01)
*H04N 23/71* (2023.01)

(52) U.S. Cl.
CPC ............. *H04N 23/73* (2023.01); *H04N 23/71* (2023.01)

(58) Field of Classification Search
CPC ............................... H04N 23/73; H04N 23/71
See application file for complete search history.

(56) References Cited

U.S. PATENT DOCUMENTS

2005/0030415 A1* 2/2005 Takizawa ............... H04N 23/71 348/E5.035
2011/0298946 A1* 12/2011 Guan ........................ G06T 5/94 348/E9.051
2016/0117803 A1* 4/2016 Ueyama .................... G06T 5/70 382/274
2016/0239977 A1* 8/2016 Komatsu .................. G06T 5/50
2022/0383508 A1* 12/2022 Liu ........................ G06V 10/82
(Continued)

FOREIGN PATENT DOCUMENTS

JP 2006039666 A 2/2006
JP 2010177779 A 8/2010
(Continued)

*Primary Examiner* — Shahbaz Nazrul
(74) *Attorney, Agent, or Firm* — Cowan, Liebowitz & Latman, P.C.

(57) ABSTRACT

An image capturing apparatus including a luminance detection section that detects luminance of an image captured by an image sensor, an area detection section that calculates likelihood of an area being a specific area from the image, a determination section that determines a first area and a second area based on the luminance and the likelihood, and a correction amount calculation section that calculates a correction amount for correcting an exposure amount to the image sensor based on the first area and the second area. The first area is an area in which the likelihood is equal to or higher than a first threshold value and the luminance is equal to or higher than a second threshold value. The second area is an area in which the likelihood is lower than the first threshold value and the luminance is lower than the second threshold value.

12 Claims, 13 Drawing Sheets

(56) References Cited

U.S. PATENT DOCUMENTS

| | | | | |
|---|---|---|---|---|
| 2023/0171509 | A1* | 6/2023 | Varghese .................. | G06T 5/50<br>348/222.1 |
| 2023/0254588 | A1* | 8/2023 | Kawashima ............. | G03B 7/08<br>348/362 |

FOREIGN PATENT DOCUMENTS

| | | | |
|---|---|---|---|
| JP | 2016151955 | A | 8/2016 |
| JP | 2019029833 | A | 2/2019 |

* cited by examiner

IMAGE CAPTURING APPARATUS CAPABLE OF PERFORMING EXPOSURE CORRECTION, METHOD OF CONTROLLING IMAGE CAPTURING APPARATUS, AND STORAGE MEDIUM

BACKGROUND

Technical Field

The disclosure relates to an image capturing apparatus that is capable of performing exposure correction, a method of controlling the image capturing apparatus, and a storage medium.

Description of the Related Art

In a digital camera or smartphone that performs image capturing by using an image sensor, such as a CMOS sensor, in general, exposure correction is automatically performed such that an image captured by the image sensor has a proper luminance as a whole. Exposure correction is performed, for example, such that a luminance of an image captured by the image sensor is detected for each pixel or for each predetermined section (area formed by a plurality of pixels obtained by dividing an imaging surface of the image sensor into fixed sizes), and the average luminance of all pixels becomes a constant value. In doing this, if a high-luminance area, such as the sky on a clear day, exists in addition to a main object, the average luminance is largely influenced by the high-luminance area, whereby an exposure amount determined by exposure correction is shifted toward the high-luminance side, causing a problem that the main object becomes dark.

To solve this problem, there has been disclosed a technique for obtaining a luminance Yup of an upper area (sky area) of an image and a luminance Ydown of a lower area (area other than the sky area) and calculating an exposure correction amount that reduces the influence of the upper area as the value of Yup/Ydown is larger (see e.g. Japanese Laid-Open Patent Publication (Kokai) No. 2010-177779).

However, the technique disclosed in Japanese Laid-Open Patent Publication (Kokai) No. 2010-177779 assumes that the sky is present in the upper part of the image, and a low-luminance object is present in the lower part of the image, and hence there is a problem that in a photographing scene which does not satisfy this assumption, it is impossible to perform proper exposure correction.

To cope with this, in recent years, a technique is used in which an area is detected from an optical image of an object by using a neural network which has been caused to learn an area desired to detect (hereinafter referred to as the "detection target area"), and an exposure correction amount is determined based on the detected area (see e.g. Japanese Laid-Open Patent Publication (Kokai) No. 2019-029833). By using the neural network which has learned using images including a detection target area in a variety of states, it is considered that it is possible to accurately detect a sky area in a variety of types of photographing scenes and properly perform exposure correction.

SUMMARY

According to a first aspect of the embodiments, there is provided an image capturing apparatus including at least one processor, and a memory storing instructions that, when executed by the at least one processor, causes the at least one processor to function as a detection unit configured to detect luminance of an image captured by an image sensor, a calculation unit configured to calculate a likelihood of an area being a specific area from the image, a determination unit configured to determine a first area and a second area based on the luminance and the likelihood, and a correction unit configured to calculate a correction amount for correcting an exposure amount to the image sensor, based on the first area and the second area, wherein the first area is an area in which the likelihood is equal to or higher than a first threshold value and the luminance is equal to or higher than a second threshold value, and wherein the second area is an area in which the likelihood is lower than the first threshold value and the luminance is lower than the second threshold value.

According to a second aspect of the embodiments, there is provided a method of controlling an image capturing apparatus, including detecting luminance of an image captured by an image sensor, calculating a likelihood of an area being a specific area from the image, determining a first area and a second area based on the luminance and the likelihood, and calculating a correction amount for correcting an exposure amount to the image sensor, based on the first area and the second area, wherein the first area is an area in which the likelihood is equal to or higher than a first threshold value and the luminance is equal to or higher than a second threshold value, and wherein the second area is an area in which the likelihood is lower than the first threshold value and the luminance is lower than the second threshold value.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

DESCRIPTION OF THE EMBODIMENTS

Figure 1:
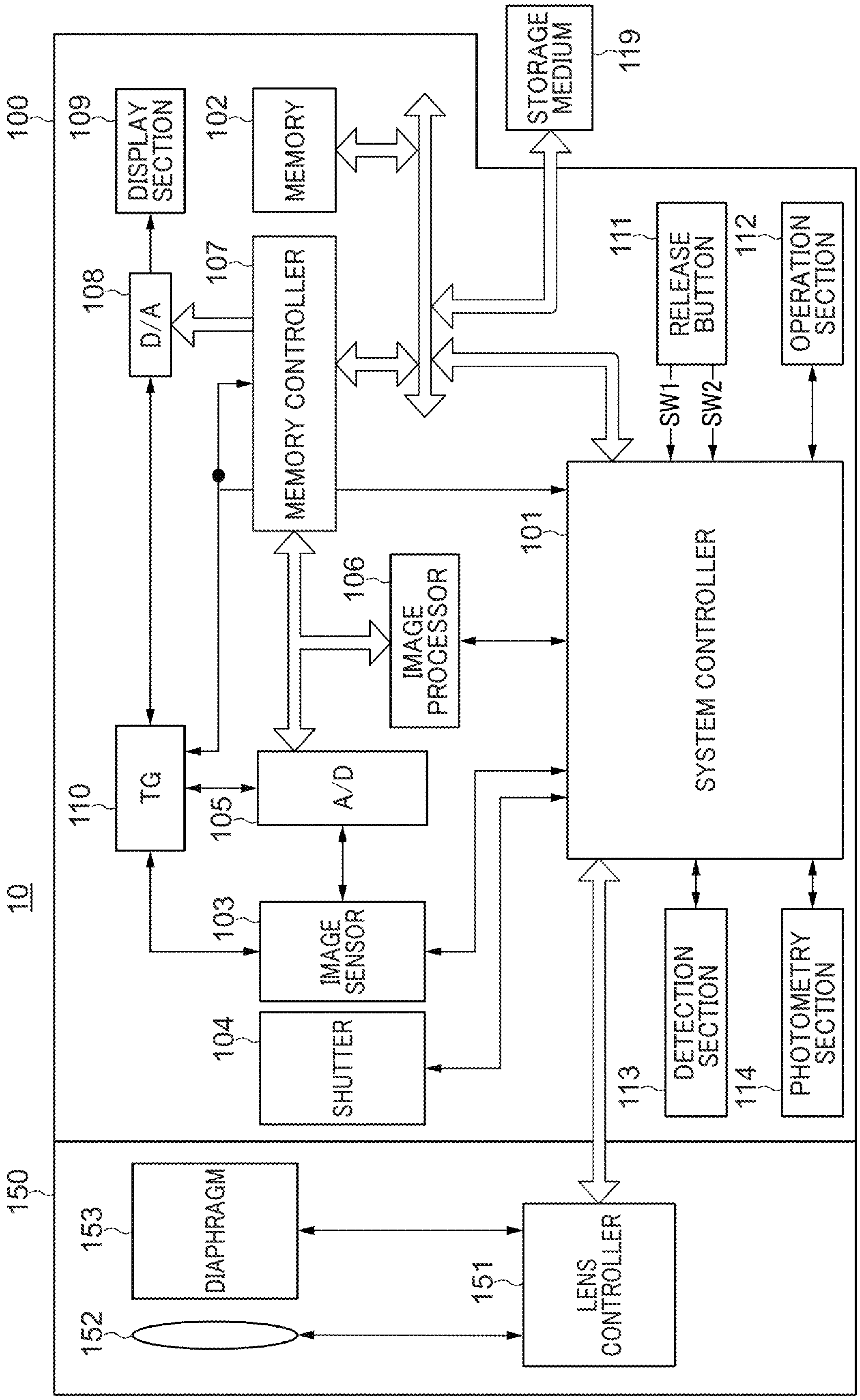
FIG. 1 is a block diagram showing a schematic configuration of an image capturing system according to embodiments.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

FIG. 1 is a block diagram showing a schematic configuration of an image capturing system 10 according to the embodiments. The image capturing system 10 is formed by an image capturing apparatus 100 and a lens barrel 150 which can be removably attached to the image capturing apparatus 100.

The image capturing apparatus 100 is a so-called digital camera and includes a system controller 101, a memory 102, an image sensor 103, a shutter 104, an analog-to-digital (A/D) converter 105, an image processor 106, a memory controller 107, a digital-to-analog (D/A) converter 108, a display section 109, and a tone generator (TG) 110. The image capturing apparatus 100 further includes a release button 111, an operation section 112, a storage medium 119, a detection section 113, and a photometry section 114. The lens barrel 150 is a so-called interchangeable lens and includes a lens controller 151, a lens group 152, and a diaphragm 153.

In the image capturing apparatus 100, the system controller 101 is a microcomputer formed by a central processing unit (CPU), memories, such as a ROM and a RAM, and so forth, and performs centralized control of the operation of the image capturing system 10. The shutter 104 controls exposure to the image sensor 103 according to a control signal output from the system controller 101. The image sensor 103 is a charge accumulation-type photoelectric conversion device, such as a CMOS sensor, generates analog image signals by photoelectrically converting an optical image formed on an imaging surface of the image sensor 103 by light incident through the lens barrel 150, and outputs the generated analog image signals to the A/D converter 105. The A/D converter 105 converts the analog image signals sent from the image sensor 103 to digital image signals and sends the converted digital image signals to the memory controller 107 and the image processor 106.

The image processor 106 generates image data by performing pixel interpolation processing, resize processing, color conversion processing, processing for correcting saturated pixels and black-out pixels, and the like on the digital image signals sent from the A/D converter 105. Further, the image processor 106 performs the same processing on the image data sent from the memory controller 107. The memory 102 temporarily holds a variety of types of data items, including the digital image signals output from the A/D converter 105 and the image data on which predetermined processing has been performed by the image processor 106 and the like. The D/A converter 108 converts the image data read from the memory 102 to analog image signals for display and sends the analog image signals to the display section 109.

The display section 109 has a display device, such as a liquid crystal panel, and displays a menu screen and an image based on the analog image signals for display, which are sent from the D/A converter 108. The image data output from the A/D converter 105 and obtained by performing predetermined image processing by the image processor 106 is converted from digital to analog by the D/A converter 108 and displayed on the display section 109, whereby the live view display can be performed. The TG 110 sends timing signals indicating timings of operations in the camera, such as a timing of driving the image sensor 103, a timing of changing a frame rate, and a timing of operating the shutter 104 to expose and block the image sensor 103, to the components of the image capturing apparatus 100.

The release button 111 is formed by a two-step switch that generates an SW1 signal when the pressing operation is half performed (half-pressed) and generates an SW2 signal when the pressing operation is completely performed (fully-pressed). The system controller 101 executes a shooting preparation operation, such as ranging calculation processing and photometric calculation processing, upon receipt of the SW1 signal, and performs a shooting operation upon receipt of the SW2 signal. The operation section 112 is an operation member (except the release button 111) used by a user to input a variety of operation instructions to the system controller 101 and is comprised of switches, buttons, dials, and so forth, including, specifically, a power switch, a menu button, a direction indicating button, and so forth. The operation section 112 includes a touch panel integrally formed with the display section 109.

The detection section 113 detects a specific object, such as the sky and a person, from a captured image (image output from the A/D converter 105 and subjected to the predetermined development processing in the image processor 106). The photometry section 114 sets a photometry frame (photometry area) within an image capturing screen and further performs photometric calculation using a captured image. Note that the detection section 113 and the photometry section 114 can be provided integrally with the system controller 101 or the image processor 106. The storage medium 119 is e.g. a memory card which can be inserted into and removed from the image capturing apparatus 100 or incorporated in the image capturing apparatus 100 and stores image data of photographed images (still images and moving images).

In the lens barrel 150, the lens group 152 is formed by a plurality of lenses, including an optical axis shift lens, a zoom lens, and a focus lens. The diaphragm 153 adjusts a light amount of a light flux transmitted through the lens group 152. In a state in which the lens barrel 150 has been attached to the image capturing apparatus 100, the lens controller 151 and the system controller 101 can bidirectionally communicate with each other via interfaces. The lens controller 151 transmits information concerning the configuration and the function of the lens barrel 150 to the system controller 101. Further, the lens controller 151 performs centralized control of the operation of the lens barrel 150 according to a command from the system controller 101 and notifies the system controller 101 of a result of the control. The lens controller 151 has actuators for driving the lens group 152 and the diaphragm 153, respectively, and controls the driving of the lens group 152 and the diaphragm 153 according to instructions from the system controller 101.

Figure 2:
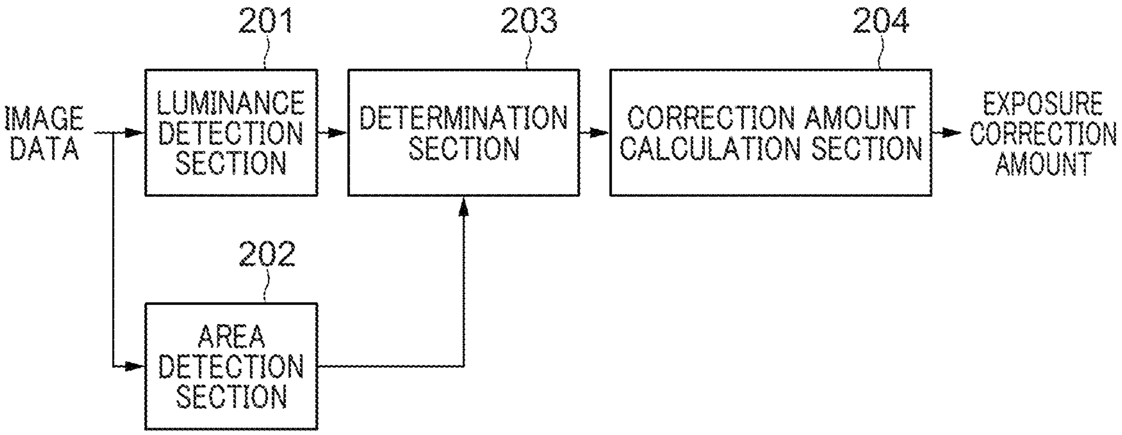
FIG. 2 is a block diagram useful in explaining a functional configuration according to a first embodiment, for performing exposure correction.

Next, a functional configuration of the image capturing system 10 according to a first embodiment, for performing exposure correction when image capturing is performed, will be described. FIG. 2 is a block diagram useful in explaining the functional configuration according to the first embodiment, for performing exposure correction when image capturing is performed. The functional configuration for performing exposure correction when image capturing is performed is formed by a luminance detection section 201, an area detection section 202, a determination section 203, and a correction amount calculation section 204. The functions of the luminance detection section 201, the determination section 203, and the correction amount calculation section 204 are executed by the photometry section 114, and the function of the area detection section 202 is executed by the detection section 113.

The image data output from the A/D converter 105 and subjected to the predetermined development processing in the image processor 106 is input to the luminance detection section 201 and the area detection section 202. The image data input to the luminance detection section 201 and the area detection section 202 is, specifically, image data of a frame image acquired when the live view is executed (before final shooting of a still image or moving image) or image data of an image acquired by half-pressing the release button 111.

The luminance detection section 201 detects luminance information (specifically, a luminance value) of input image data for each pixel or for each section which is formed by a predetermined number of pixels and obtained by dividing the imaging surface of the image sensor 103 into sections each having a fixed size.

The area detection section 202 detects a specific area (detection target area) from the input image data. Note that in the present embodiment, as the detection target area, a sky area is detected. As a result of detection of the sky, the area detection section 202 outputs a likelihood (probability) of being the sky, for each pixel or each section, as a sky determination score. As the sky determination score, for example, an 8-bit value (0 to 255) can be used, and as the sky determination score is higher, the likelihood of being the sky becomes higher.

In the present embodiment, a detection unit of luminance information detected by the luminance detection section 201 and a detection unit of the sky determination score determined by the area detection section 202 are set to the same section unit by taking the processing performed by the determination section 203 on the subsequent stage into account. However, this is not limitative, but the detection unit can be set to a pixel unit.

As the area detection method, a known method can be used, and for example, a method using color information (see e.g. Japanese Laid-Open Patent Publication (Kokai) No. 2016-151955) and a method of identifying an area using a neural network (see e.g. Japanese Laid-Open Patent Publication (Kokai) No. 2006-39666) can be used. In the present embodiment, area detection is performed by using a neural network. Image data obtained by executing the area detection processing is held in the memory 102.

Figure 11B:
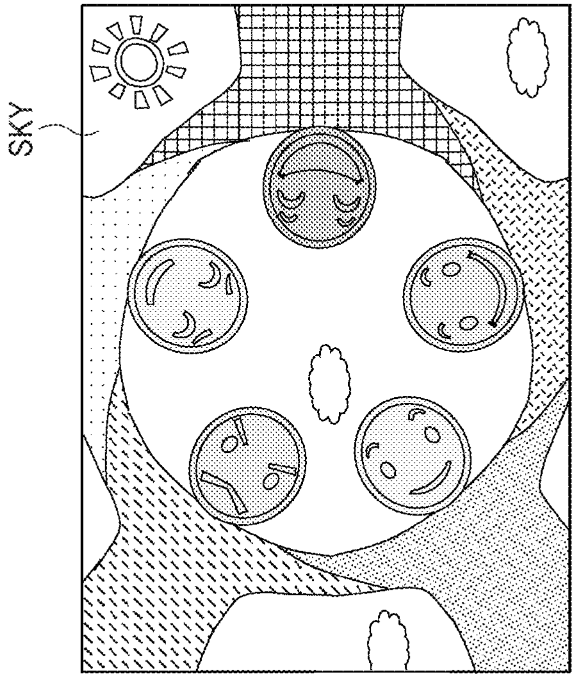
FIGS. 11A and 11B are diagrams showing images used for learning of a neural network.
Figure 11A:
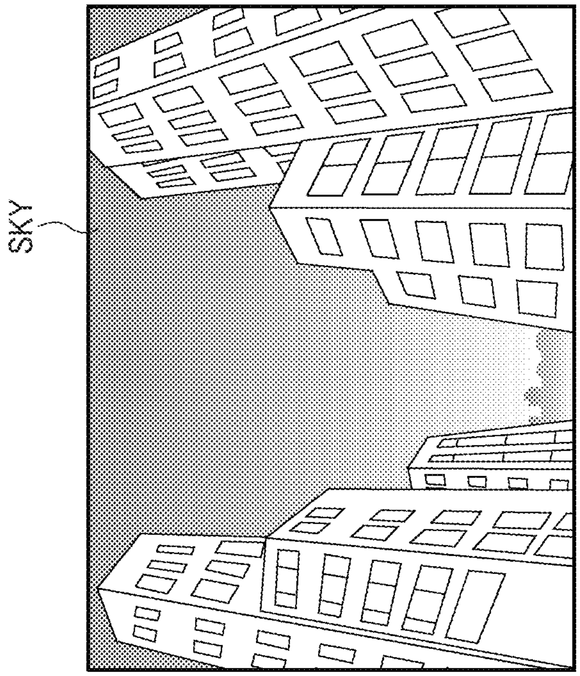

Here, an example of learning the neural network, for detecting an area estimated as the sky, will be described. FIGS. 11A and 11B are diagrams each showing an example of an image used for learning a neural network. In the image shown in FIG. 11A, a sky area is present between right and left buildings, and the sky area is bright at a part close to the ground and dark at an upper part, like the sky at the sunset time. In the image shown in FIG. 11B, the upper half bodies of a plurality of persons forming a circle as viewed from the ground toward the sky have been photographed, and a bright sky area is present between the persons in the whole image. The sky areas in the respective images shown in FIGS. 11A and 11B are set as correct answer areas, and learning of the neural network is performed. Further, learning of the neural network is similarly performed by using images having a variety of sky areas, not shown.

As a photographing scene including the sky, there are a variety of scenes, such as a scene of the blue sky, a scene of the cloudy sky, a scene of the evening sky, and a scene of the night sky (starry sky). If a variation of photographing scenes used to cause the neural network to perform learning increases, the difficulty level of the learning becomes higher. However, when the user-friendliness is taken into consideration, it is desirable that exposure correction can be performed in more photographing scenes. To achieve this, in the present embodiment, it is assumed that the neural network is caused to learn as many different photographing scene of the sky.

Referring again to FIG. 2 again, the determination section 203 determines a sky area and a non-sky area by collating the luminance information obtained by the luminance detection section 201 and the sky determination score obtained by the area detection section 202. The sky area refers to an area determined as the sky in the image, based on both of the luminance value and the sky determination score, and the non-sky area refers to an area determined as not the sky in the image, based on both of the luminance value and the sky determination score. The method of determining the sky area and the non-sky area will be described hereinafter.

The correction amount calculation section 204 calculates a correction amount for correcting an exposure amount (exposure value) to the image sensor 103 (hereinafter referred to as the "exposure correction amount") based on the respective luminance values and area sizes of the sky area and the non-sky area, which are determined by the determination section 203. The method of calculating the exposure correction amount will be described hereinafter.

Figure 3:
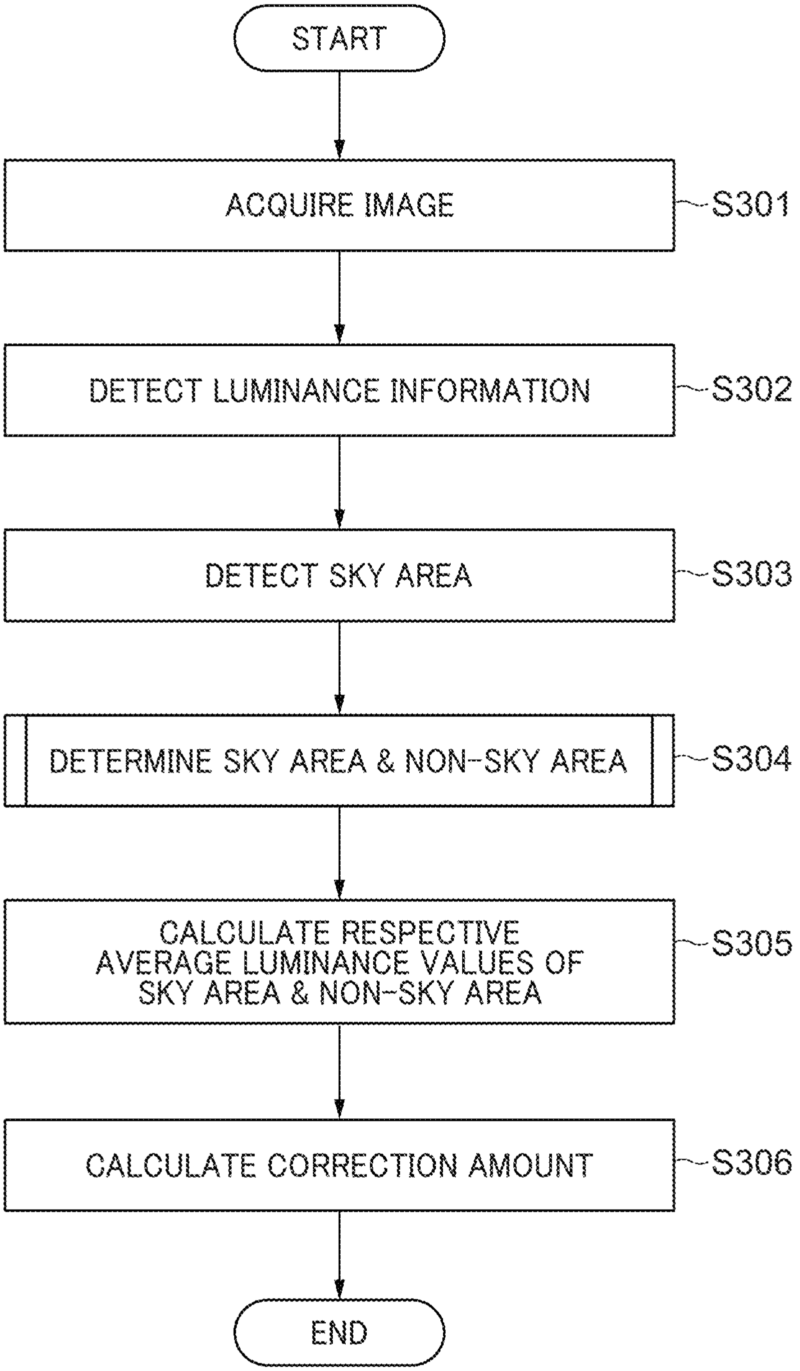
FIG. 3 is a flowchart of a process for determining an exposure correction amount.

FIG. 3 is a flowchart of a process for determining an exposure correction amount in the image capturing system 10. Each processing (step) denoted by S number in the flowchart is realized by the CPU of the system controller 101, which loads a predetermined program stored in the ROM of the same into the RAM of the same, to perform centralized control of the operations of the components of the image capturing system 10.

In a step S301, the system controller 101 acquires image data to be input to the luminance detection section 201 and the area detection section 202, from the image processor 106 and sends the acquired image data to the luminance detection section 201 and the area detection section 202. The image data acquired from the image processor 106 is the image data, which has been output from the A/D converter 105 to the image processor 106 and generated by performing predetermined development processing in the image processor 106, i.e. the image data acquired before final shooting.

In a step S302, the luminance detection section 201 detects the luminance information (luminance values detected from each section in the image) from the image data acquired in the step S301.

In a step S303, the area detection section 202 detects a sky area from the image data acquired in the step S301. Detection of the sky area is performed by determining a sky determination score for each section in the image.

In a step S304, the determination section 203 determines a sky area and a non-sky area by using the luminance information detected in the step S302 and the sky determination score determined in the step S303.

Figure 4:
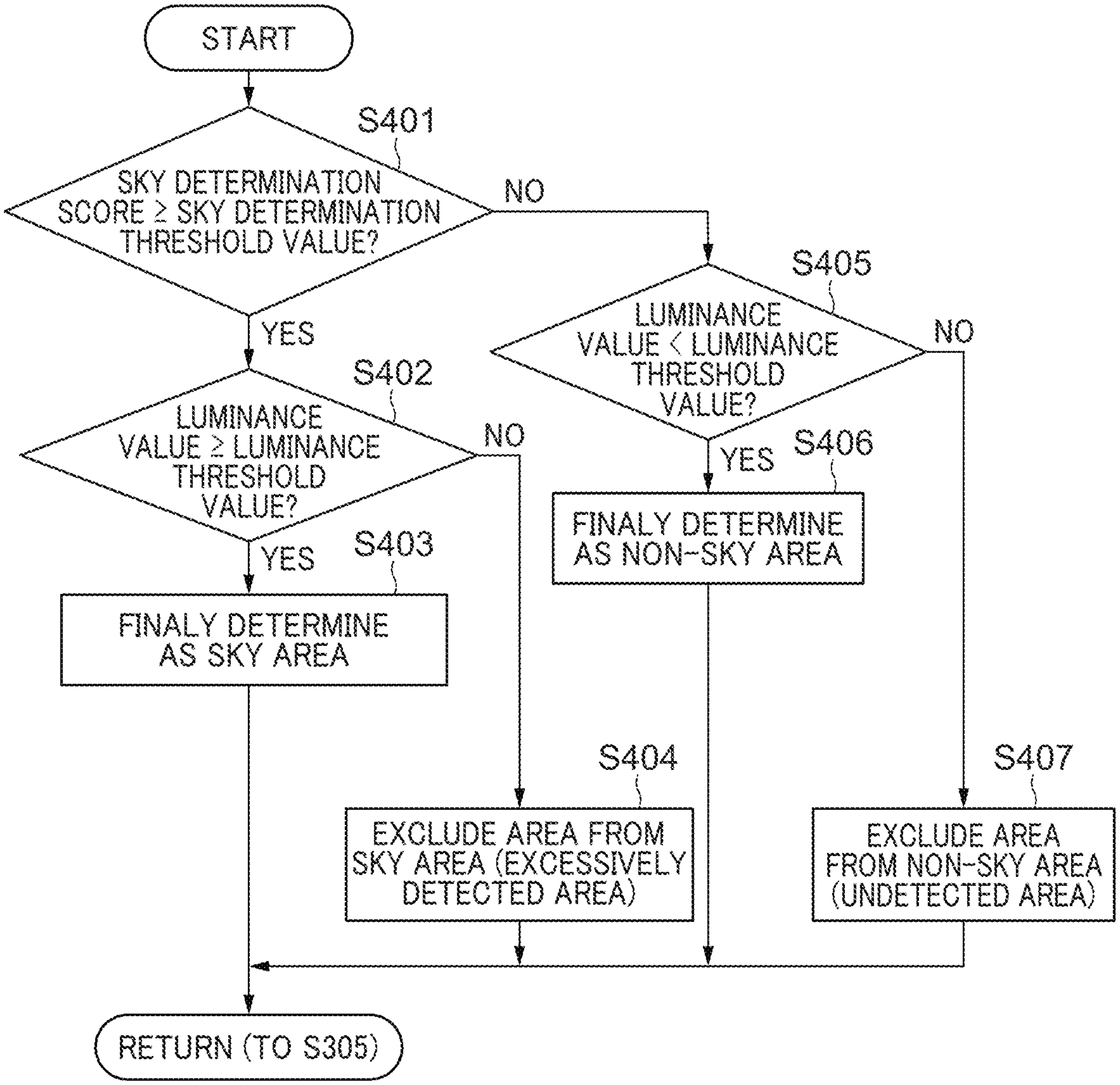
FIG. 4 is a flowchart of a process performed in a step in the process in FIG. 3.

Here, the method of determining the sky area and the non-sky area will be described. FIG. 4 is a flowchart of the process performed in the step S304. This process is performed for each section in the image. In the following description, a section to be processed is referred to as the "attention-drawn section".

In a step S401, the determination section 203 determines whether or not the sky determination score of the attention-drawn section is equal to or larger than a sky determination threshold value (first threshold value). As described above, the sky determination score takes a value in a range of 0 to 255, and hence the sky determination threshold value is a fixed value set in advance within the range of 0 to 255. For example, in a case where the sky determination threshold value is set to 128, an attention-drawn section having a sky determination score equal to or higher than 128 is determined to be high in likelihood of being the sky, and further, with the luminance information as described hereinafter, whether or not the attention-drawn section is a sky area is finally determined. If it is determined that the sky determination score is equal to or larger than the sky determination threshold value (YES in S401), the determination section 203 executes a step S402, whereas if it is determined that the sky determination score is lower than the sky determination threshold value (NO in S401), the determination section 203 executes a step S405.

Figure 5:
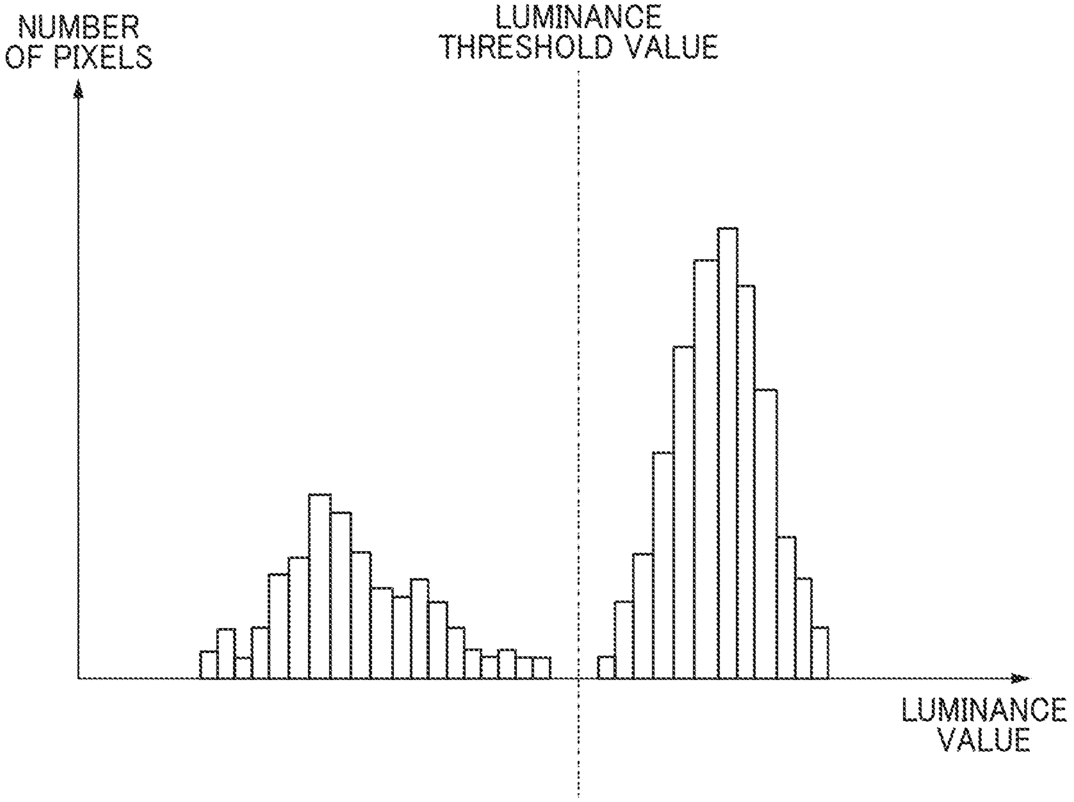
FIG. 5 is a diagram showing a luminance histogram detected in a step in the process in FIG. 3 and a luminance threshold value associated with the luminance histogram.

In the step S402, the determination section 203 determines whether or not the luminance value of the attention-drawn section is equal to or larger than a luminance threshold value (second threshold value). FIG. 5 is a diagram showing an example of a luminance histogram detected in the step S302 and the luminance threshold value. The brightness of the sky varies depending on a scene, such as the daybreak, clear weather, the cloudy sky, and the sunset, and luminance values of a bright area and a dark area in the image varies with this. Therefore, it is desirable to use an average luminance of the whole image for the luminance threshold value. By determining whether or not the luminance value of the attention-drawn section is equal to or larger than the luminance threshold value, it is possible to determine whether the attention-drawn section in the image is a high-luminance area or a low-luminance area.

If it is determined that the luminance value of the attention-drawn section is equal to or larger than the luminance threshold value (YES in S402), the determination section 203 executes a step S403, whereas if it is determined that the luminance value of the attention-drawn section is smaller than the luminance threshold value (NO in S402), the determination section 203 executes a step S404.

In the step S403, the determination section 203 finally determines that the attention-drawn section is the sky area, followed by terminating the present process (i.e. proceeding to the step S305 in FIG. 3).

Here, in the area detection performed by using the neural network, a detection error can occur. The detection error includes an excessive detection error that an area which is not the detection target area is detected as the detection target area, and an undetected error that an area is the detection target area but cannot be detected as the detection target area. The attention-drawn section determined as "NO" in the step S402 forms an excessively detected area. Therefore, in the step S404, the determination section 203 excludes this attention-drawn section from the sky area, followed by terminating the present process (i.e. proceeding to the step S305 in FIG. 3). Thus, by executing the determination processing in the step S401 and S402, only an area having a high likelihood of being the sky and at the same time having a large luminance value is finally determined as the sky area.

In the step S405, the determination section 203 determines whether or not the luminance value of the attention-drawn section is smaller than the luminance threshold value. If it is determined that the luminance value of the attention-drawn section is smaller than the luminance threshold value (YES in S405), the determination section 203 executes a step S406, whereas if it is determined that the luminance value of the attention-drawn section is equal to or larger than the luminance threshold value (NO in S405), the determination section 203 executes a step S407.

In the step S406, the determination section 203 finally determines the attention-drawn section as the non-sky area, followed by terminating the present process (i.e. proceeding to the step S305 in FIG. 3).

Here, in the area detection using the neural network, as described above, the undetected error that an area which is the sky area is detected as an area having a high likelihood of not being the sky can occur. The attention-drawn section determined as "NO" in the step S405 forms an undetected area. Therefore, in the step S407, the determination section 203 excludes the attention-drawn section from the non-sky area, followed by terminating the present process (i.e. proceeding to the step S305 in FIG. 3). Thus, by executing the determination processing in the step S401 and the step S405, only an area having the low likelihood of being the sky and at the same time having a small luminance value is determined as the non-sky area. Thus, it is possible to reduce the excessive detection error and the undetected error of the sky area in the step S303 and correctly determine the sky area and the non-sky area.

Note that although in the flowchart in FIG. 4, comparison between the luminance value and the luminance threshold value is performed after comparing the sky determination score and the sky determination threshold value, the order of these comparison steps can be reversed.

Figure 6A:
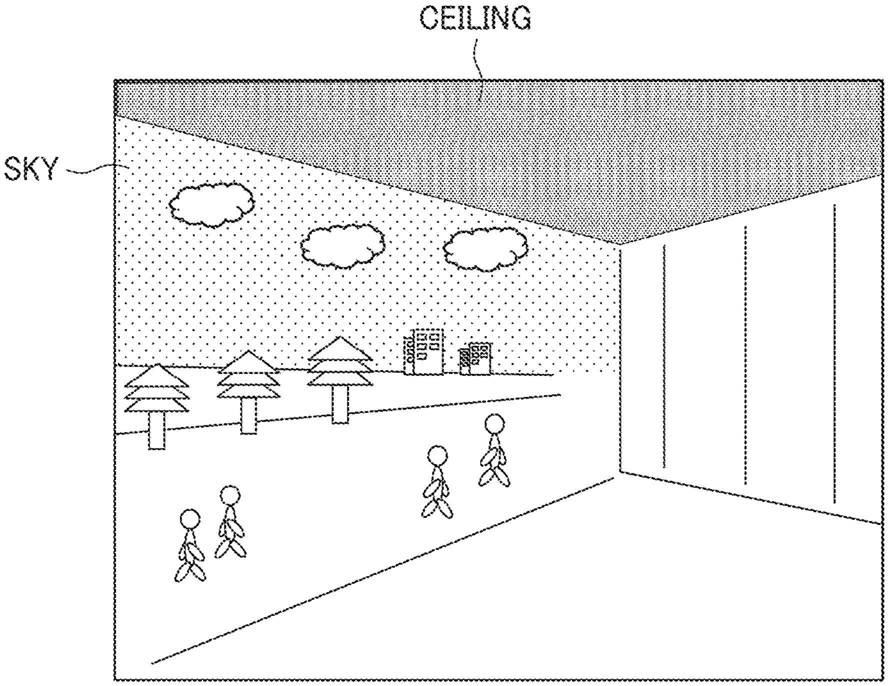
FIGS. 6A and 6B are diagrams showing an image including a sky area (correct answer), and a result of area detection performed thereon, which are acquired in the process in FIG. 3.
Figure 6B:
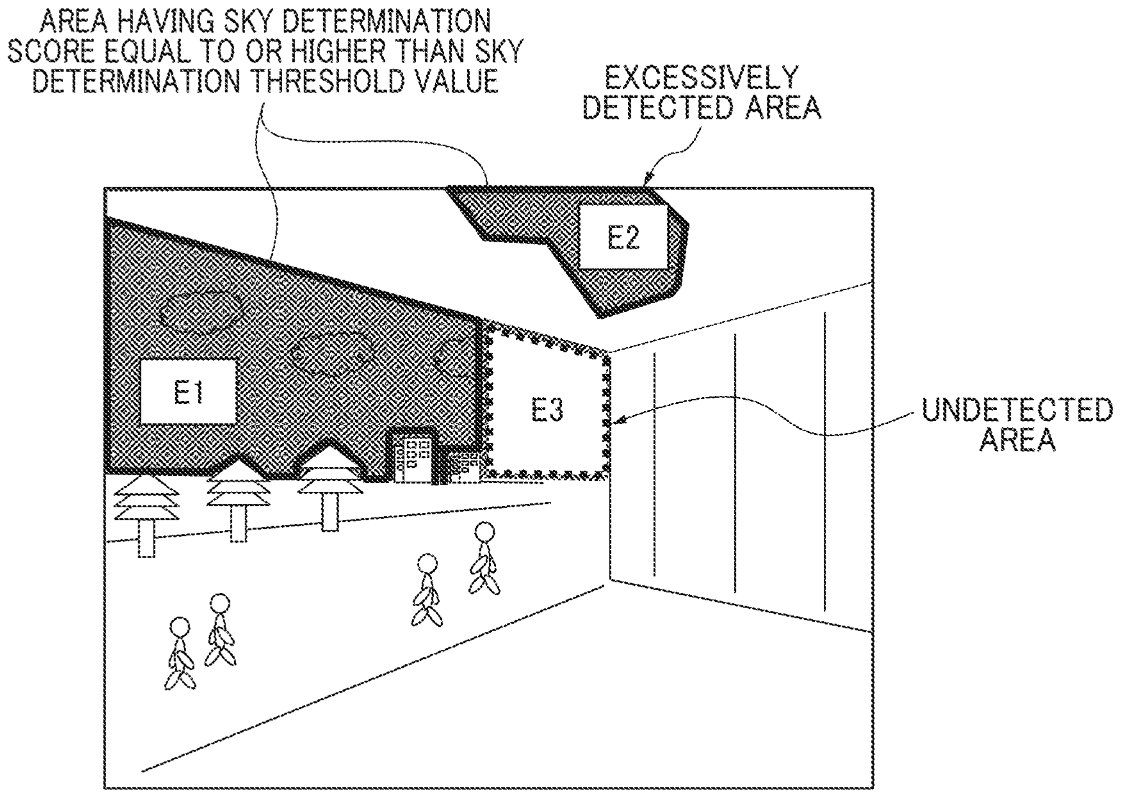

The process of the flowchart in FIG. 4 will be further described with reference to an example of the image. FIG. 6A is a diagram showing an example of the image acquired in the step S301. FIG. 6B is a schematic diagram showing a result of the area detection performed with respect to the image shown in FIG. 6A in the step S303. As shown in FIG. 6A, a ceiling of a building is photographed together with an outdoor scenery including the sky. Referring to FIG. 6B, areas E1 and E2 are areas each having a sky determination score equal to or higher than the sky determination threshold value, and an area E3 schematically represents an area having a sky determination score lower than the sky determination threshold value.

The area E1 correctly detects the sky area, but the area E2 is an area corresponding to part of the ceiling area, which is determined as an excessively detected area. In this case, an area determined as the sky area in the step S403 is only the area E1 which is high in the sky determination score and at the same time high in luminance, and the area E3 is excluded from the sky area because the area E3 is not high in luminance. Th area E3 is not treated as the non-sky area, either, but determined as an undetected area.

Areas other than the areas E1 and E2 are areas each having the sky determination score lower than the sky determination threshold value, and in areas other than the areas E1 to E3, the non-sky area as an area which is not the sky is correctly detected, but detection of the area E3 as the sky area has failed. In this case, an area determined as the non-sky area in the step S406 is a low-luminance area out of the areas other than the areas E1 to E3, but the area E3 is a high-luminance area, and hence the area E3 is excluded from the non-sky area. The area E3 is not treated as the sky area, either, but determined as the undetected area.

The description refers to FIG. 3 again. In a step S305, the correction amount calculation section 204 calculates an averaged value (hereinafter referred to as the "average luminance value") of luminance values of each of the sky area and the non-sky area, which are determined in the step S304. The average luminance of the sky area can be calculated by dividing the sum of the luminance values of all sections in the sky area by the number of the sections, and the average luminance of the non-sky area can also be calculated by calculation similarly performed.

In a step S306, the correction amount calculation section 204 calculates an exposure correction amount. In the calculation of the exposure correction amount, respective differences between an average luminance value AveS of the sky area and an average luminance value AveNS of the non-sky area, which are calculated in the step S305, and a current exposure control value EvC are calculated. A difference ΔEvS between the average luminance value AveS of the sky area and the current exposure control value EvC and a difference ΔEvNS between the average luminance value AveNS of the non-sky area and the current exposure control value EvC are calculated by using equations (1) and (2), described below, respectively. Next, an exposure correction amount SC is calculated by an equation (3), described below, using an area size nS of the sky area, an area size nNS of the non-sky area, and a difference ΔEvAve between the average luminance of the whole image and the exposure control value. Note that the difference ΔEvAve is calculated by using an equation (4), described below.

In the equation (3), described below, "α" and "β" are coefficients set in advance, for adjusting a degree of contribution of the sky area and the non-sky area to the exposure correction amount SC. In a photographing scene in which a main object (non-sky area) is liable to become dark due to back light, for example, in a scene including the bright sky, there is a demand for preventing the main object from becoming too dark. In this case, the coefficients α and β are set such that the degree of contribution of the non-sky area to the exposure correction amount SC is larger than the degree of contribution of the sky area to the exposure correction amount SC. That is, a relationship represented by α<β is set. For example, by setting α=0.8 and β=1.2, it is possible to make the degree of contribution of the non-sky area to the exposure correction amount SC 1.5 times larger than the degree of contribution of the sky area to the exposure correction amount SC.

$$\Delta EvS = AveS - EvC \tag{1}$$

$$\Delta EvNS = AveNS - EvC \tag{2}$$

$$SC = \frac{\Delta EvS \times nS \times \alpha + \Delta EvNS \times nNS \times \beta}{nS + nNS} - \Delta EvAve \tag{3}$$

$$\Delta EvAve = EvAve - EvC \tag{4}$$

The coefficients α and β can be changed according to a state of the non-sky area. For example, in a case where there is a non-sky area from which a person (such as a face, a head, an upper half body, or the whole body of a person) is detected by the detection section 113, it is estimated that there is a high possibility that the person is the main object. Therefore, in a case where a person is present in a non-sky area, the setting of the coefficients α and β can be changed such that the value of the coefficient β is made still larger than the coefficient α. For example, in a case where the default setting is [α=0.8, β=1.2], if the presence of a person is detected from a non-sky area, the coefficients are changed to the setting [α=0.5, β=1.5]. This makes it possible to increase the influence of the non-sky area on the exposure correction amount SC.

As described above, according to the present embodiment, exposure correction is performed by excluding the excessively detected area and the undetected area of the sky area which are examples of the detection target area, whereby it is possible to determine a more proper exposure condition.

Next, a second embodiment of the disclosure will be described. In the second embodiment, a configuration for revising the exposure correction amount SC determined in the first embodiment will be described. Note that the image capturing system 10 shown in FIG. 1 is also applied to the present embodiment. Further, the functional configuration in the present embodiment includes an exposure correction amount-revising section added to the functional configuration shown in FIG. 2.

Figure 7:
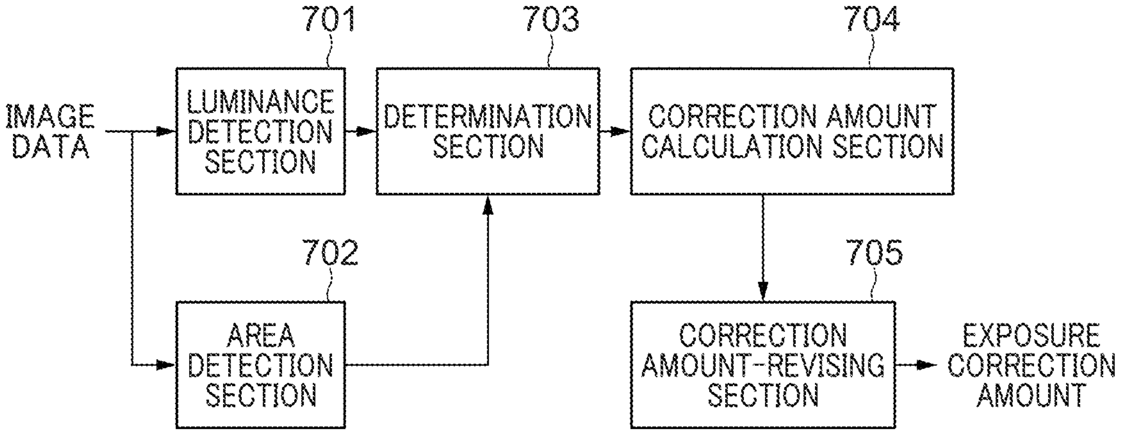
FIG. 7 is a block diagram useful in explaining a functional configuration according to a second embodiment, for performing exposure correction.

FIG. 7 is a block diagram useful in explaining a functional configuration according to the second embodiment, for performing exposure correction when image capturing is performed. The functional configuration for performing exposure correction when image capturing is performed includes a luminance detection section 701, an area detection section 702, a determination section 703, a correction amount calculation section 704, and a correction amount-revising section 705. The luminance detection section 701, the area detection section 702, the determination section 703, and the correction amount calculation section 704 are the same as the luminance detection section 201, the area detection section 202, the determination section 203, and the correction amount calculation section 204, shown in FIG. 2, respectively, and hence description of those is omitted. The correction amount-revising section 705 revises the exposure correction amount SC calculated by the correction amount calculation section 704 and determines the final correction amount (hereinafter referred to as the "revised exposure correction amount"). The function of the correction amount-revising section 705, i.e. calculation of the revised exposure correction amount is executed by the photometry section 114.

Figure 8:
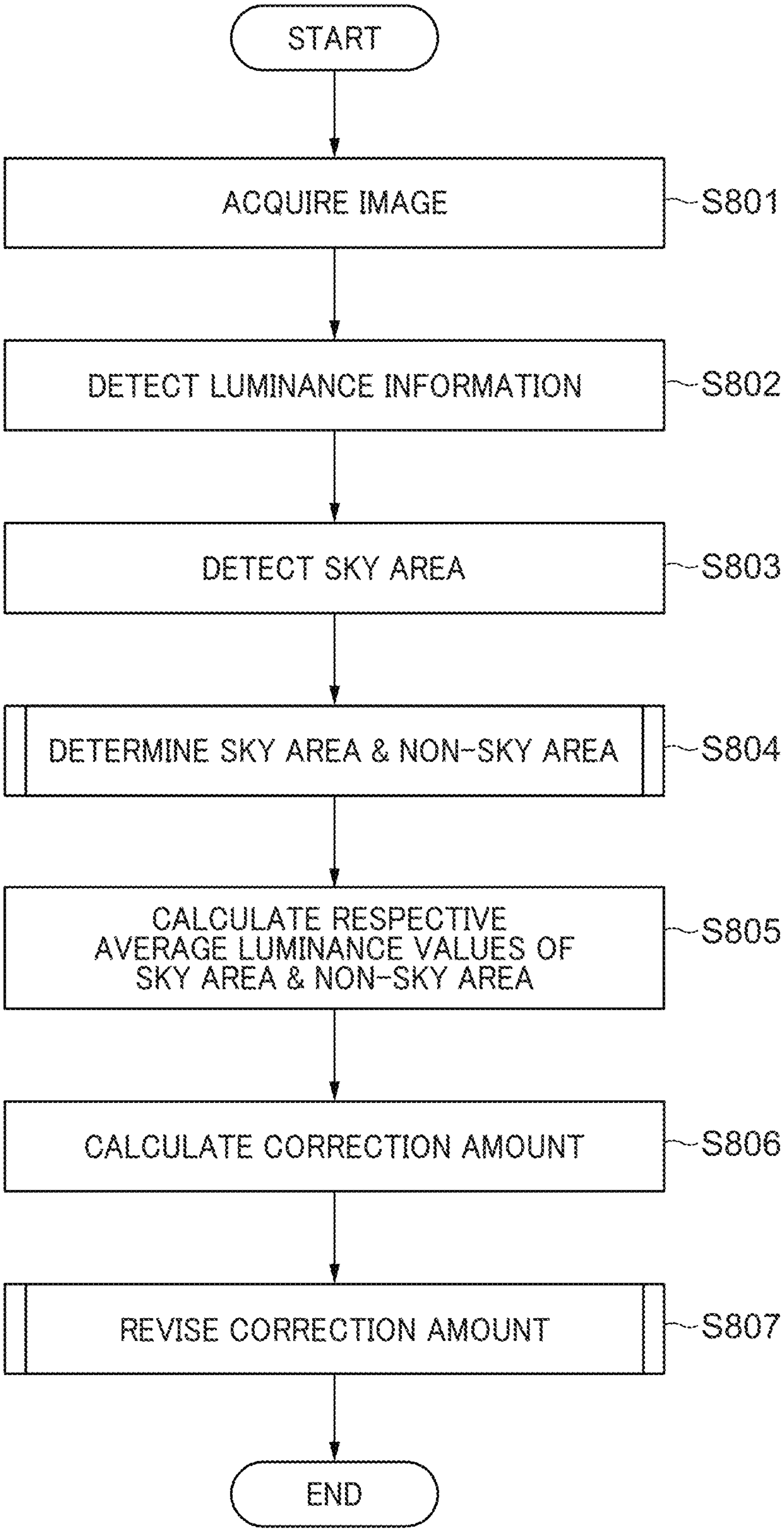
FIG. 8 is a flowchart of a process for determining a revised exposure correction amount.

FIG. 8 is a flowchart of a process for determining a revised exposure correction amount in the image capturing operation in the image capturing system 10. Each processing (step) denoted by S number in this flowchart is realized by the CPU of the system controller 101, which loads a predetermined program stored in the ROM of the same into the RAM of the same to perform centralized control of the operations of the components of the image capturing system 10.

Processing operations in S801 to S806 are the same as those in the step S301 to S306 of the flowchart in FIG. 3, and hence description thereof is omitted. In a step S807, the correction amount-revising section 705 performs calculation for revising the exposure correction amount SC calculated in the step S806 to calculate a revised exposure correction amount.

Figure 9:
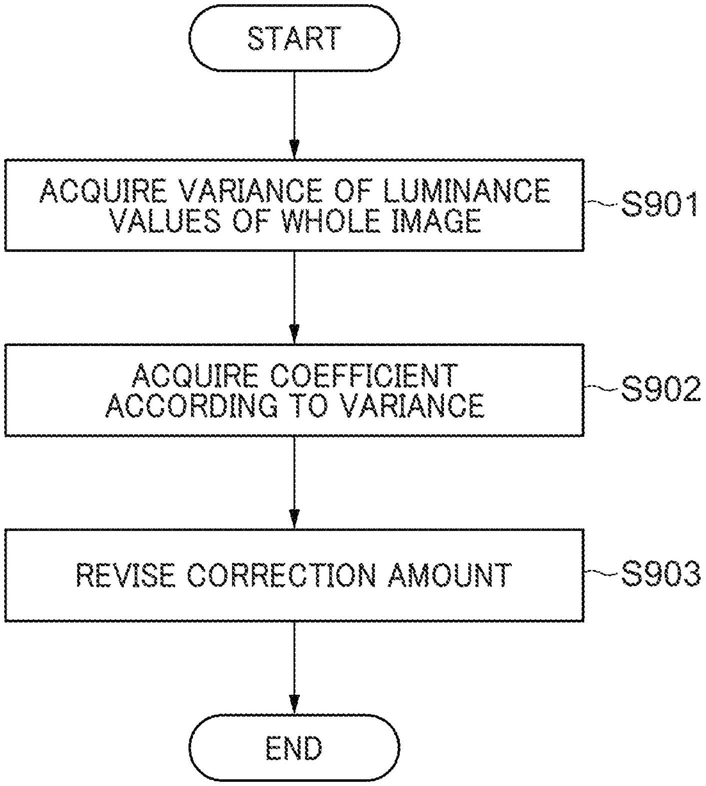
FIG. 9 is a flowchart of a process performed in a step in the process in FIG. 8.

Here, the process for calculating the revised exposure correction amount in the step S807 will be described. FIG. 9 is a flowchart of the process performed in the step S807.

In a step S901, the correction amount-revising section 705 acquires variance of luminance values of the whole image. Here, similar to the first embodiment, it is assumed that the luminance detection section 701 has detected the luminance information for each section. At this time, the variance $EV_{var}$ can be calculated by an equation (5), described below, using luminance values $Ev_1$, $Ev_2$, . . . , and $Ev_n$, detected from the n sections of the image, respectively, and the average value $Ev_{ave}$ of the luminance values of the whole image. It is found from the equation (5) that the variance $Ev_{var}$ becomes large in an image having a large variation of the luminance (difference in brightness is large) and becomes small in an image having a small variation of the luminance (difference in brightness is small).

$$Ev_{var} = \frac{1}{n}\{(Ev_1 - Ev_{ave})^2 + (Ev_2 - Ev_{ave})^2 + \ldots + (Ev_n - Ev_{ave})^2\} \tag{5}$$

In a step S902, the correction amount-revising section 705 acquires a coefficient according to the variance obtained in the step S901 (hereinafter referred to as the "coefficient k"). The coefficient k is represented e.g. by $k=EV_{var}\times\gamma$. The coefficient k is defined to be larger as the value of the variance $EV_{var}$ is larger and smaller as the value of the variance $EV_{var}$ is smaller. The value "$\gamma$" is a fixed value, and for example, $\gamma=0.1$ can be set, but can be defined to change according to the value of the variance $EV_{var}$.

In a step S903, the correction amount-revising section 705 revises the exposure correction amount SC calculated in the step S806 by using the coefficient calculated in the step S902. Specifically, by multiplying the exposure correction amount SC calculated in the step S806 by the coefficient k calculated in the step S902, a revised exposure correction amount $SC_R$ is obtained. That is, the revised exposure correction amount $SC_R$ is calculated by $SC_R=SC\times k$, followed by terminating the present process.

Normally, the coefficient k is determined to take a value within a range of $0<k\leq1$. Further, as described above, the coefficient k is determined to be larger as the variance is larger and smaller as the variance is smaller. In other words, it can be said that revision of the exposure correction amount SC is processing for maintaining a result of exposure correction for an image having a large difference in brightness and suppressing exposure correction based on a result of determination of the sky area for an image having a small difference in brightness.

Figure 10A:
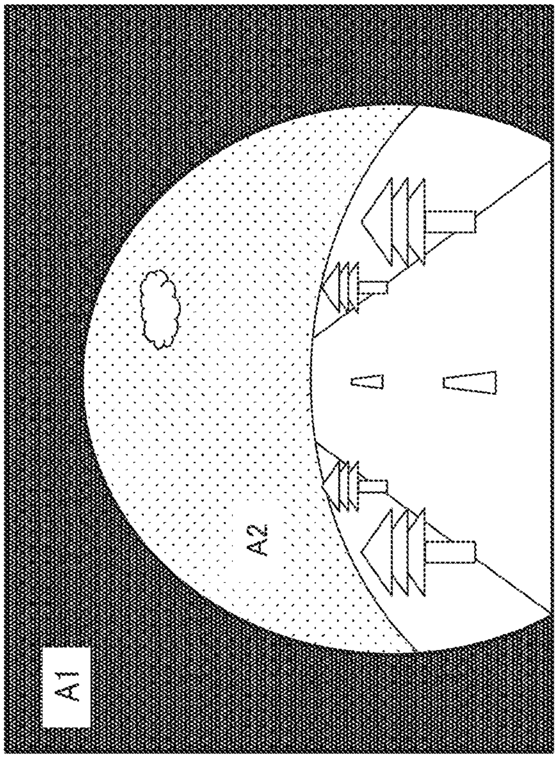
FIGS. 10A to 10D are diagrams showing frame images and luminance histograms associated with the frame images, respectively.
Figure 10B:
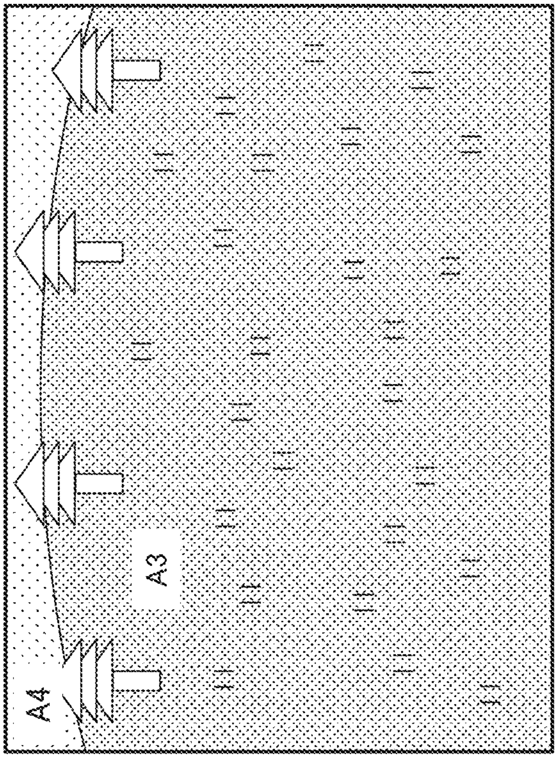

Next, an effect of revising the exposure correction amount SC calculated in the step S806 as described above in the step S807 will be described. FIGS. 10A and 10B are diagrams each showing an example of a frame image obtained by the live view.

Figure 10C:
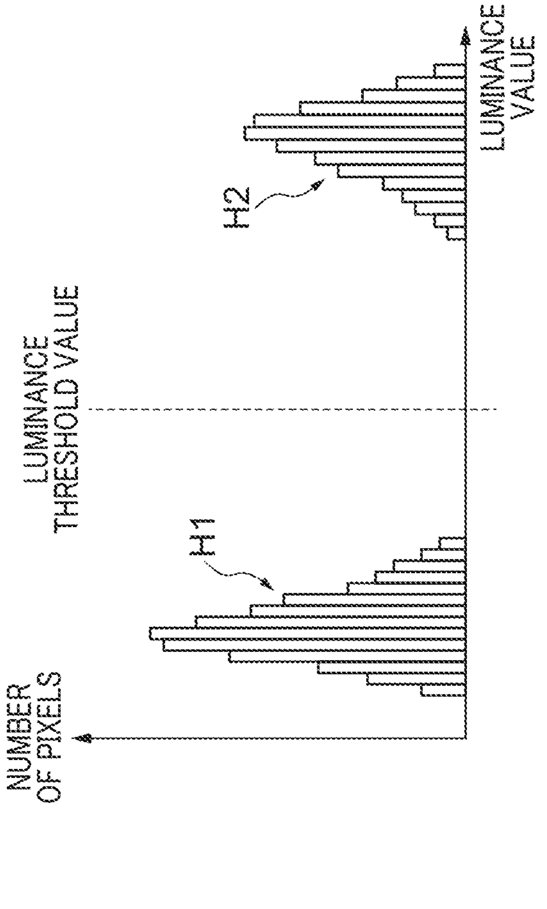

FIG. 10A shows a frame image in a photographing scene as viewed from the vicinity of the exit of a tunnel toward the exit, in which an area A1 indicates a dark area inside the tunnel, and an area A2 indicates a sky area in the outdoor scenery which can be viewed from the exit of the tunnel. FIG. 10C shows a luminance histogram of the sky area (area having the sky determination score equal to or higher than the sky determination threshold value) detected from the frame image shown in FIG. 10A in the step S803.

The average luminance value of the whole frame image shown in FIG. 10A is set as the luminance threshold value. A first luminance value group H1 represents the luminance values of areas detected to be high in likelihood of being the sky in the area A1, by the sky detection in the step S803 (excessively detected area). Further, a second luminance value group H2 represents the luminance values of areas correctly detected as the sky in the area A2, by the sky detection in the step S803.

The excessively detected areas detected as the area having the high likelihood of being the sky in the area A1 are smaller in luminance value compared with respect to the area A2, and hence the first luminance value group H1 and the second luminance value group H2 are separated into the high-luminance side and the low-luminance side. Further, the difference in brightness in the whole frame image is large, so that the luminance threshold value as the average luminance of the whole image is liable to be set in the middle between the first luminance value group H1 and the second luminance value group H2. Therefore, in the case of an image in which the bright area and the dark area are clearly separated, even when the sky area has been excessively detected in the step S803, the determination based on the luminance threshold value makes it possible to exclude the excessively detected are and correctly determine the sky area.

In this case, basically, the necessity of revising the exposure correction amount SC in the step S807, calculated in the step S806, is low. Even in a case where the exposure correction amount SC is revised in the step S807, the value of the variance $Ev_{var}$ is large, and hence the coefficient k is set to a value close to "1" within the range of $0<k\leq1$.

Figure 10D:
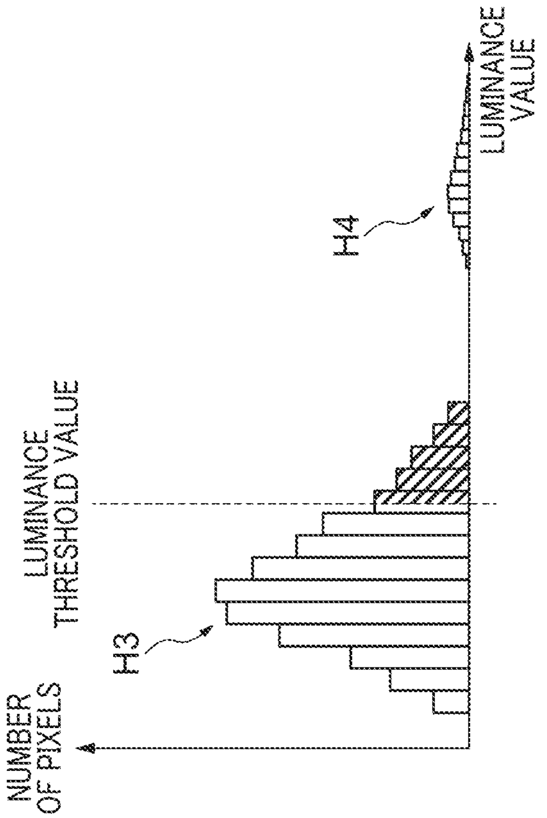

FIG. 10B shows a frame image in a photographing scene in which most part of the area is a grass field, and a small sky area is present above the grass field. An area A3 represents the grass field area, and an area A4 represents the sky area, respectively. FIG. 10D shows a luminance histogram of the sky area (area having the sky determination score equal to or higher than the sky determination threshold value) detected from the frame image shown in FIG. 10B in the step S803.

Here as well, the average luminance value of the whole frame image shown in FIG. 10B is set to the luminance threshold value. A third luminance value group H3 represents luminance values of areas detected as an area having a high likelihood of being the sky (excessively detected area) in the area A3 by the sky detection in the step S803. A fourth luminance value group H4 represents luminance values of areas correctly detected as the sky in the area A4 by the sky detection in the step S803.

Part of the third luminance value group H3 has luminance values equal to or larger than the luminance threshold value as indicated by a hatched area. Therefore, the excessively detected areas corresponding to the part indicated by the hatched area are to be finally determined as the sky area in the step S804. This is because the average luminance of the whole frame image is used as the luminance threshold value. That is, the average luminance is largely influenced by the luminance of the grass field (area A3) occupying most of the areas in the frame image, which makes it impossible to set the luminance threshold value to a value with which the sky area and the other area can be discriminated from each other.

To cope with this, the exposure correction amount SC calculated in the step S806 is revised by the processing in the step S807. The coefficient k is set to a small value with respect to an image having small variance in luminance as mentioned above. That is, a revised exposure correction amount $SC_R$ is determined such that the exposure correction amount SC calculated in the step S806 is reduced. As a result, in a case where the difference in brightness in the image is small, exposure correction based on the result of detection of the sky area is suppressed.

Not only in such a photographing scene as shown in FIG. 10B, but also in an image mostly occupied by the sky area and an image having a small difference in luminance between the sky area and the other area, since the variance of the luminance is small, the coefficient k is set to be small, and it is possible to suppress exposure correction based on a result of detection of the sky area. Further, although in the present embodiment, the exposure correction amount SC is revised by using the coefficient k based on the variance of the luminance in the image, an index (coefficient) representing variation, such as standard deviation and a quartile range, can be used in place of the variance.

As described above, by revising the exposure correction amount SC according to variation of the luminance values of an image, for a photographing scene in which it is difficult to properly determine a luminance threshold value, the exposure correction based on a result of detection of the sky area is suppressed, whereby it is possible to obtain a photographed image on which the exposure has been more properly corrected.

The disclosure has been described in detail heretofore based on the embodiments thereof. However, the disclosure is not limited to these embodiments, but it is to be understood that the disclosure includes various forms within the scope of the gist of the disclosure. Further, the embodiments of the disclosure are described only by way of example, and it is possible to combine the embodiments on an as-needed basis.

For example, although in the above-described embodiments, the image capturing system 10 formed by the image capturing apparatus 100 (digital camera) and the lens barrel 150 (interchangeable lens) has been described, the disclosure can also be applied to an electronic device that is capable of acquiring an image by using an image sensor. Examples of this electronic device include a digital video camera, a smartphone, a tablet PC, and a mobile phone equipped with a camera.

Further, although in the above-described embodiments, the average luminance of the whole image is used for the luminance threshold value, a fixed value can be used for the luminance threshold value, similarly to the case where the fixed value is used for the sky determination threshold value. Further, although in the above-described embodiments, the sky area is taken as the detection target area, the detection target area is not limited to the sky area. When desired to reduce the difficulty of learning with respect to learning of the neural network, for example, the neural network can be caused to learn only the blue sky and the cloudy sky.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-036754 filed Mar. 11, 2024, which is hereby incorporated by reference herein in its entirety.

What is claimed is:

1. An image capturing apparatus including:
- at least one processor; and
- a memory storing instructions that, when executed by the at least one processor, causes the at least one processor to function as:
- a detection unit configured to detect luminance of an image captured by an image sensor;
- a calculation unit configured to calculate a likelihood of an area being a specific area from the image;
- a determination unit configured to determine a first area and a second area based on the luminance and the likelihood; and
- a correction unit configured to calculate a correction amount for correcting an exposure amount to the image sensor, based on the first area and the second area,
- wherein the first area is an area in which the likelihood is equal to or higher than a first threshold value and the luminance is equal to or higher than a second threshold value, and
- wherein the second area is an area in which the likelihood is lower than the first threshold value and the luminance is lower than the second threshold value.

2. The image capturing apparatus according to claim 1, wherein the second threshold value is an average luminance of the whole image.

3. The image capturing apparatus according to claim 1, wherein the correction unit corrects the correction amount based on respective degrees of contribution of the first area and the second area to the correction amount.

4. The image capturing apparatus according to claim 3, wherein the degree of contribution is set to a larger value for the second area than for the first area.

5. The image capturing apparatus according to claim 3, wherein the at least one processor is caused to further function as a processing unit configured to detect a person from the image, and
- wherein in a case where the detected person is present in the second area, the correction unit increases the degree of contribution of the second area.

6. The image capturing apparatus according to claim 1, wherein the at least one processor is caused to further function as a revising unit configured to revise the correction amount based on variance in the luminance of the image.

7. The image capturing apparatus according to claim 6, wherein the revising unit makes the correction amount smaller as the variance is smaller.

8. The image capturing apparatus according to claim 1, wherein the first area is a sky area, and the second area is an area which is not the sky area.

9. The image capturing apparatus according to claim 1, wherein the calculation unit calculates the likelihood for each pixel or for each section.

10. The image capturing apparatus according to claim 1, wherein the image is a frame image of live view or an image acquired by a half-pressing operation of a release button included in the image capturing apparatus.

11. A method of controlling an image capturing apparatus, comprising:

detecting luminance of an image captured by an image sensor;

calculating a likelihood of an area being a specific area from the image;

determining a first area and a second area based on the luminance and the likelihood; and calculating a correction amount for correcting an exposure amount to the image sensor, based on the first area and the second area, wherein the first area is an area in which the likelihood is equal to or higher than a first threshold value and the luminance is equal to or higher than a second threshold value, and wherein the second area is an area in which the likelihood is lower than the first threshold value and the luminance is lower than the second threshold value.

12. A non-transitory computer-readable storage medium storing a program for causing a computer to execute a method of controlling an image capturing apparatus, wherein the method comprises:

detecting luminance of an image captured by an image sensor;

calculating a likelihood of an area being a specific area from the image;

determining a first area and a second area based on the luminance and the likelihood; and calculating a correction amount for correcting an exposure amount to the image sensor, based on the first area and the second area, wherein the first area is an area in which the likelihood is equal to or higher than a first threshold value and the luminance is equal to or higher than a second threshold value, and wherein the second area is an area in which the likelihood is lower than the first threshold value and the luminance is lower than the second threshold value.

* * * * *